Dec. 7, 1965
W. H. POWERS ETAL
3,222,090
CLAMPED CONNECTION
Filed Feb. 9, 1962
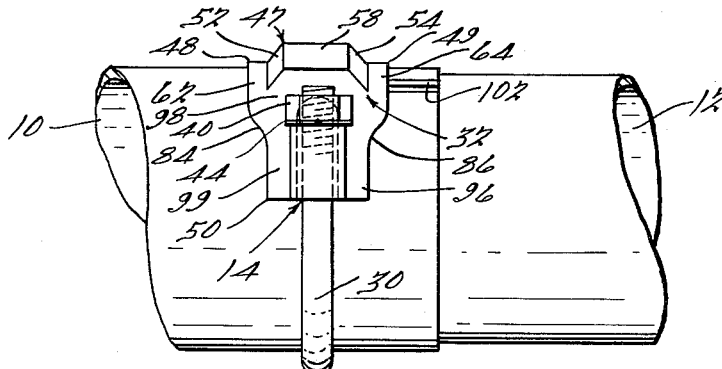
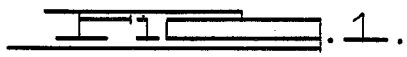
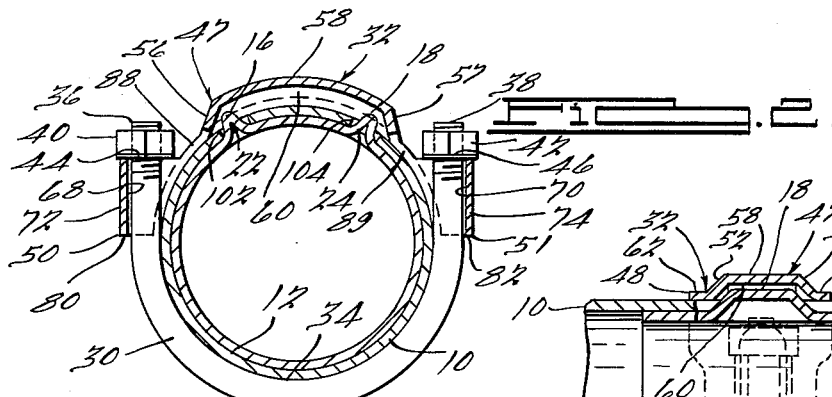
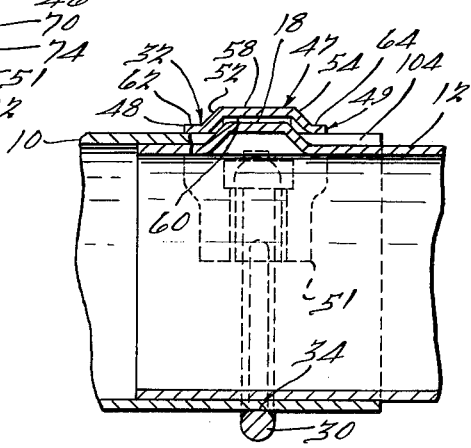
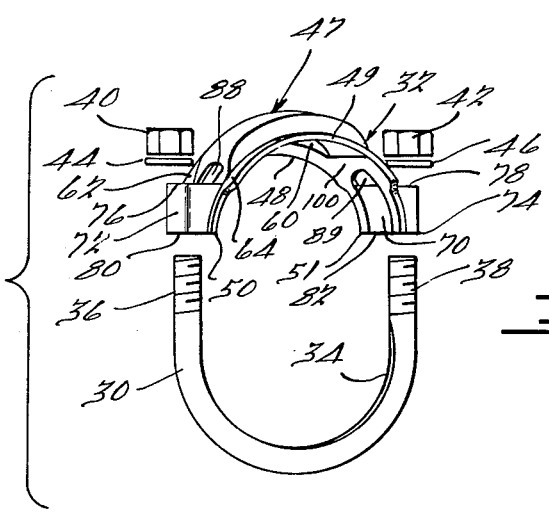
INVENTORS.
Walter H. Powers
BY Joseph J. Vlasak
ATTORNEYS United States Patent Office 3,222,090
Patented Dec. 7, 1965

3,222,090
CLAMPED CONNECTION
Walter H. Powers and Joseph J. Vlasak, Racine, Wis., assignors to Walker Manufacturing Co., a corporation of Delaware
Filed Feb. 9, 1962, Ser. No. 172,268
1 Claim. (Cl. 285—27)

This invention relates to clamps such as those used to connect internal combustion engine mufflers and exhaust pipes.

It is an object of the invention to provide clamp structure which produces a relatively low unit pressure on the part being clamped together.

Another object is to provide a saddle for a clamp structure having an optimum stress distribution.

A further object is to provide a clamp structure giving more uniform sealing but less serious deformation of the parts being clamped together and which conforms to the shape of the part being clamped.

Still another object is to provide a pipe coupling wherein the pipes to be connected have a rib and slot arrangement which is cooperable with clamping means to locate and secure one end of a pipe within another.

The above and other objects are achieved by means of a saddle which is formed by a progressive die from a flat metal blank into a semi-circular shape containing a centrally located, box-shaped rib and a pair of semi-circular arches at opposite ends of the rib which are adapted to internally receive the ends of a flattened, semi-circular U-bolt, such as that shown in copending application, Serial Number 341,083, filed January 29, 1964, which application is a continuation of application, Serial No. 55,011, filed September 9, 1960, now abandoned, in the names of Joseph Vlasak and Walter H. Powers. The ends of the U-bolt are provided with fastening means to secure the bolt to the saddle and which bear on the tops of the arches to serve as means for drawing the saddle and U-bolt into tight peripheral engagement with telescoped pipe means extending therethrough. The clamping means are cooperable with telescoping pipe ends having axially extending mating slots and ridges to obtain a new and improved clamping arrangement.

The invention is illustrated in its presently preferred form in the accompanying drawings in which:

FIGURE 1 is a side elevational view of a clamping arrangement embodying the principles of the present invention and adapted to secure a muffler inlet or outlet bushing to an exhaust or tail pipe of an automobile;

FIGURE 2 is a sectional view taken along the line 2—2 in FIGURE 1;

FIGURE 3 is a sectional view taken along the line 3—3 in FIGURE 2; and

FIGURE 4 is an exploded perspective view of the clamping arrangement.

In the drawings, the numeral 10 indicates a section of pipe of an inlet or outlet bushing of a muffler and the numeral 12 indicates a section of an exhaust pipe or tail pipe to which it is desired to clamp the section of pipe 10 in a peripherally sealed connection by means of the present clamping structure indicated generally at 14. The section of pipe 12 is of a diameter which permits telescopic insertion thereof within the section of pipe 10. A plurality of locking ribs in the form of axially extending ridges 16, 18 are circumferentially spaced around the pipe 12 and axially spaced inwardly from the end of the pipe so as to leave a continuous cylindrical surface at the end of the pipe to form a continuous closed connection between the pipes 10, 12 as shown in FIGURE 3. The ridges are integrally formed by radially outwardly deformed portions of the pipe to form substantially V-shaped grooves 22, 24 on the inner periphery of the pipe and the ridges 16, 18 on the outer periphery. The outer surfaces of the ridges are curvilinear in cross section, in FIGURE 2, as shown and the portions of the pipe therebetween have a common cylindrical curvature which forms a continuation of the cylindrical periphery of the pipe. The ridges serve the purpose of providing locating and clamping means which are cooperable with a clamp assembly as hereinafter described. The number and location of the ridges and grooves may be varied as desired, although the provision of two ridges and grooves which are equally spaced on opposite sides of the top center of the pipe, as shown in FIGURE 2, is particularly advantageous. Expansion slot means (not shown) are conventionally provided in the end of the pipe 12 to facilitate assembly of one pipe within the other. The expansion means are necessary because the outside diameter of the pipe 12 is dimensioned relative to the inside diameter of the pipe 10 to provide a frictional fit therewithin.

The clamping means 14 comprises a U-bolt 30 and a saddle member 32. As pointed out in the aforementioned copending application, the bolt 30 is originally of round cross-section but its semi-circular inside pipe-engaging surface is flattened as seen at 34 to reduce unit stresses on the outside of the pipe 10. The ends of the bolts are cylindrical and threaded as seen at 36, 38 to receive nut members 40, 42. Lock washer members 44, 46 may be provided to secure the nut members in place.

The saddle member 32 is formed in a three-stage progressive die into a semi-circular cross sectional shape as can be seen in FIGURES 2 and 4. A radially outwardly extending cap portion, indicated generally at 47, is centrally formed in the saddle member relative to the side edges 48, 49 and the ends 50, 51. The cap portion is defined by inclined side surfaces 52, 54, 56, 57 which terminate in an arcuately extending top wall 58. Accordingly, the cap portion 44 defines a central cavity 60. The cap portion 47 divides the saddle member into a pair of spaced pipe contacting flanges 62, 64.

The end portions of the saddle member are of identical construction and provide bolt receiving passages 68, 70. The passages 68, 70 are defined by integral wall portions 72, 74 of the saddle member. The wall portions 72, 74 are provided with flat parallel upper and lower surfaces 76, 78 and 80, 82. The upper surfaces 76, 78 provide seats for the nut members and lock washers. The side surfaces 48, 49 of the saddle member are necked in toward one another, as indicated at 84, 86 in FIGURE 1, at each end of the clamping member so that sufficient metal is provided formation of the bolt receiving arches defined by the wall portions 72, 74. The formation of the bolt receiving arches by outward deformation of the wall portions 72, 74 defines U-shaped slots 88, 90 opening outwardly at the ends of the clamping member and forming separate flange portions 94, 96 at each end of the saddle member which form continuations of the pipe-engaging flanges 62, 64. Accordingly, the saddle member is provided with axially spaced pipe-clamping flanges throughout its arcuate length except for two flange connecting portions 98, 100.

Surface contact between the saddle member and the periphery of the pipe will be obtained substantially only along the axially spaced flanged portions. The central cavity 60 provides a degree of resiliency which enables substantially continuous contact to be established between the pipe and all of the bottom surfaces of the saddle member when the bolt is clamped in position. The total surface contact area of the saddle member is approximately equal to the surface area provided by the flattened portion of the U-bolt so that unit stresses are reduced to the point where they are not likely to "brinell" or do other harm to the surface or surface coating of the pipe portion 10. In addition, the equal surface areas provide substantially uniform relative stressing throughout the entire area being clamped. In order to accommodate the ribs in the assembled position, corresponding axially extending slots 102, 104 are provided in the end of the pipe section 10. The ridges are received within the slots 102, 104 as the pipes are telescoped within one another. As may be seen in FIGURES 2 and 3, the ribs protrude radially outwardly beyond the outer surface of the pipe portion 10 and extend into the clamping saddle cavity 10 a substantial distance. As may be seen in FIGURE 2, the slots in the end portion of the pipe 10 are sufficiently oversize relative to the width of the ribs to prevent peripheral contact therebetween so that the ribs may be slidably inserted axially along the slots until the pipe 12 is properly located in the pipe 10.

The slots in the end portion of the pipe 10 terminate closely adjacent the curved surface of the pipe portion 12 adjacent the ribs. In order to prevent the edges of the slots in the pipe portion 10 from being outwardly bent during assembly or use, the flange portions of the saddle extend circumferentially beyond the end portions of slots and serve to back up the edges of the slots and prevent them from being peened upwardly.

In assembly of the subject clamping structure, the pipe portion 12 is telescopically inserted within the pipe section 10 by slightly contracting the end of the pipe section and aligning the ribs on the section 12 with the corresponding slots on the section 10. The ribs additionally provide expansion and contraction joints which to a certain extent facilitates contraction of the pipe end 12. When the pipes have been inserted, pipe 12 is frictionally retained within the pipe end 10. In order to secure the pipe ends in their telescoped positions and to effect a seal around the entire periphery thereof, the clamping means comprising the saddle member 32 and the U-bolt 30 are provided. As is evident, the U-bolt is mounted around substantially 180° of the peripheral surface of the outer pipe 10 and the saddle is inserted thereon by mounting the ends 36, 38 of the U-bolt in the passages 68, 70 provided therein. The nuts 40, 42 and lock washers 44, 46 are mounted on the threaded ends of the bolt and the nuts are tightened down until they are seated on the upper flat surfaces 76, 78 and draw the bolt and the saddle into tight peripheral engagement with the outer surface of the pipe 10. As the nuts are tightened on the threaded portions, the clamping members are tightened and drawn radially inwardly. The slots provided in the outer pipe member 10 and the expansion and contraction joints provided in the inner pipe member 12 facilitate contraction of the overlapping portions of the pipe joint to effect a tight seal therebetween. The saddle member is constructed in a manner to permit it to conform the outer periphery of the pipe and apply uniform gripping forces over 360°. Since the saddle member is conformable to the pipe surface which it contacts, a joint of maximum tightness effecting a complete seal will be established. Since the inner pipe portion 12 is not provided with any axially extending slots the possibility of gas leakage in the joint is minimized. The integrally formed ribs are received in the saddle cavity 60 and prevent axially displacement of pipes 10 and 12 relative to one another. In addition, the ribs prevent relative rotation of the pipes since the ribs are spaced closely adjacent the side wall portions 56, 58 of the cap.

It is intended that minor variations in the design and arrangement of the parts are to be included within the scope of this invention as defined by the appended claim.

What is claimed is:

A clamping arrangement for telescopically connecting a first pipe within an end of a second pipe, said first pipe being provided with a pair of circumferentially spaced ribs extending radially outwardly relative to the outer periphery of said first pipe, said second pipe being formed with longitudinally extending circumferentially spaced slots receiving said ribs, said ribs and said slots being spaced circumferentially no more than 90 degrees from each other, clamping means comprised of a first member received around substantially 180 degrees of the periphery of said second pipe, a saddle member received around substantially the remaining 180 degrees of the periphery of said second pipe and means securing said first member to said saddle member, said saddle member including means defining a recess into which said ribs extend, said last named means having a first pair of facing surfaces engaging said ribs to preclude relative circumferential movement and a second pair of facing surfaces engaging said ribs to preclude relative movement in the direction of the axes of said pipes.

References Cited by the Examiner

UNITED STATES PATENTS

| 556,106 | 3/1896 | Schiele | 285—330 |
| 1,148,041 | 7/1915 | Minkler | 285—322 |
| 1,686,254 | 10/1928 | Rachlin | 285—39 |
| 2,117,955 | 5/1938 | Haas | 285—177 |
| 2,215,101 | 9/1940 | Haas | 285—322 |
| 2,959,834 | 11/1960 | Graham | 24—277 |
| 2,985,934 | 5/1961 | Daubner | 24—277 |

FOREIGN PATENTS 202,214  5/1955  Australia.

CARL W. TOMLIN, *Primary Examiner.*

R. GIANGIORGI, *Assistant Examiner.*